Patented Feb. 13, 1945

2,369,524

UNITED STATES PATENT OFFICE 2,369,524

PROCESS FOR PRODUCING CATALYSTS

Herbert Berg and Hans Heim, Burghausen, Germany; vested in the Alien Property Custodian No Drawing. Application March 10, 1941, Serial No. 382,663. In Germany March 15, 1940

10 Claims. (Cl. 252—251)

This invention relates to catalysts particularly suited for the production of vinyl esters by the reaction of acetylene with organic acids or with hydrogen halides, and to a method for preparing such catalysts.

In the preparation of organic vinyl esters it has been known heretofore to react acetylene with organic acids in the presence of a porous carrier material impregnated with zinc or cadmium salts of the organic acids. The carriers usually employed are those having active surfaces, such as active carbon, silica gel and the like. Such catalysts may also be used, for example, for the production of vinyl chloride by the thermal reaction of acetylene with hydrogen chloride; in this case the effective catalyst is formed during the course of the process. These catalysts have been produced heretofore by absorbing on active carbon, silica gel, pumice or the like, an aqueous solution of the zinc or cadmium salt. In order to concentrate the metal salt on the carrier, the usual practice has been to add an excess of the salt solution and thereafter to substantially eliminate the water by drying. In order to obtain a sufficiently anhydrous catalyst, prolonged drying under vacuum has been required, as a result of which acid vapors unavoidably are evolved from the material and the vacuum driers thereby become corroded. Also, as a result of this evolution of acid, the zinc or cadmium salts are converted to basic salts, the regeneration of which to the normal salts is very difficult because of the deleterious effect which acids have upon the catalysts. In addition, such drying under any technically practicable conditions does not yield a completely anhydrous catalyst. As a result, the initial production of vinyl acetate is accompanied by the formation of considerable amounts of acetic acid-water mixtures, which corrode the walls of the reaction chamber and of the accessory apparatus and also cause partial decomposition of the formed vinyl acetate into acid and acetaldehyde, thereby rendering difficult the isolation of the vinyl acetate from the crude reaction product.

We have now found a method whereby completely anhydrous catalysts may be produced readily, and in which the above mentioned disadvantages connected with the drying of the catalyst are obviated.

The method of our invention comprises impregnating a carrier material with a molten mixture of an organic zinc or cadmium salt with the corresponding salt of a basic nitrogen compound. If desired, an excess of the free basic nitrogen compound may be present. Preferably, anhydrous melts of this kind are employed; however, melts which are not completely anhydrous nevertheless yield catalysts which are much more suitable than those obtained by impregnating the carrier with aqueous solutions of zinc or cadmium salts. If it is desired to use as starting materials zinc or cadmium oxides and carboxylic acids which contain little or no water, the water formed by the neutralization reaction may be taken up wholly or in part by the addition of corresponding amounts of acid anhydrides.

The impregnation of porous carriers, such as active carbon, with such melts is effected with surprisingly little difficulty. The melt is merely mixed with the active carbon by stirring or thorough mixing; for example, the melt may be added to the active carbon while the latter is agitated in a suitably heated rotating drum. The catalysts thus produced may be employed forthwith for the production of vinyl acetate.

It appears surprising that impregnation in the foregoing manner yields catalysts which, for the same content of zinc or cadmium salts, are as active as those prepared in a less convenient manner from aqueous solutions. Furthermore, it is surprising that such high concentrations of the zinc and cadmium salts can be obtained at temperatures below those where decomposition of the metallic salts takes place (e. g. by splitting off ketones or other types of dissociation). It is also surprising that the nitrogen base which is introduced into the catalyst does not impair its activity. Thus it is possible to produce catalysts containing particularly large amounts of zinc or cadmium salts, which are therefore particularly active.

The more detailed practice of the invention is further illustrated by the following examples:

*Example I*

Ammonia is passed into glacial acetic acid at a temperature of 100° C. until the latter becomes saturated. The basic ammonium acetate thus produced, when heated to 140° C., dissolved 1.8 times its weight of zinc acetate. Appropriate variations of this procedure are as follows:

A. 12 kilograms of glacial acetic acid is saturated with ammonia at a temperature of 100° C. This reaction mixture is then heated to about 140° C., whereupon 18.6 kilograms of glacial acetic acid and 12.4 of zinc oxide are gradually added and become dissolved in the molten medium.

B. 12 kilograms of glacial acetic acid is saturated with ammonia at a temperature of 100° C. At a temperature of about 140° C., 10.6 kilograms of zinc oxide and a mixture of 15.0 kilograms of glacial acetic acid and 4.5 kilograms of acetic anhydride are gradually added and dissolved in the molten medium.

C. 12 kilograms of glacial acetic acid are saturated with ammonia at 100° C. At a temperature of about 140° C., 12.4 kilograms of zinc oxide and 15.6 kilograms of acetic anhydride are gradually added at the same time and dissolved in the molten medium.

In all of the foregoing procedures there are formed homogeneous melts which are sufficiently fluid to be absorbed by 30 to 35 kilograms of active carbon, thereby yielding catalysts suitable for use forthwith for the production of vinyl acetate, all of these catalysts being at least equivalent to catalysts produced from aqueous solutions. Apart from the advantages accruing from the elimination of the concentration and drying steps, it may be noted that the catalyst prepared according to procedure "A" yielded, during the initial production of vinyl acetate, a product containing much less aldehyde and aqueous reaction products than a similar catalyst prepared from an aqueous medium and dried as thoroughly as possible. In the production of vinyl acetate from the catalyst prepared according to procedure "B," the formation of aldehydes and water was still further diminished; with the catalyst prepared according to procedure "C," these undesired secondary reaction products were completely absent.

Example II

A solution of 60 grams of urea in 120 grams of glacial acetic acid, at a temperature of 100° C., dissolved 60 grams of anhydrous zinc acetate; at 130 to 150° C. a further 180 grams was dissolved; at 160° C. a still further 60 grams was dissolved. In all, five times the weight of the urea was dissolved, i. e. a 62.6% solution of zinc acetate was obtained. This solution likewise was readily absorbed by the active carbon and yielded an especially active catalyst.

Example III

The product obtained by the neutralization of 79 grams of pyridine with 30 grams of glacial acetic acid dissolved, at a temperature of 80° C., 79 grams of anhydrous zinc acetate; at 125° C. a further 79 grams was dissolved; at 150° C. a still further 79 grams, making a total of 237 grams of zinc acetate equivalent to three times the quantity of pyridine.

Example IV

A solution of 35 grams of hexamethylenetetramine and 60 grams of glacial acetic acid, at a temperature of 150° C., dissolved 70 grams of anhydrous zinc acetate.

Example V 30 grams of glacial acetic acid was neutralized with 50.5 grams of triethanolamine. At a temperature of 120° C., the molten reaction product dissolved 50.5 grams of anhydrous zinc acetate, while at 140° C. a further 50.5 grams was nearly completely dissolved.

Example VI

The neutralization product of 93 grams of aniline and 60 grams of glacial acetic acid, at a temperature of 140° C., dissolved about an equal weight of anhydrous zinc acetate.

We claim:

1. The method of preparing a catalyst which comprises impregnating a carrier with a substantially anhydrous molten mixture comprising a salt of an organic acid with a metal of group IIB of the periodic system dissolved in a molten salt of an organic nitrogen base.

2. The method of preparing a catalyst which comprises impregnating a carrier with a substantially anhydrous molten mixture comprising zinc acetate dissolved in a molten salt of an organic nitrogen base.

3. The method of preparing a catalyst which comprises impregnating a carrier with a substantially anhydrous molten mixture comprising cadmium acetate dissolved in a molten salt of an organic nitrogen base.

4. The method of preparing a catalyst which comprises impregnating a carrier with a substantially anhydrous molten mixture comprising a salt of an organic acid with a metal of group IIB of the periodic system dissolved in molten ammonium acetate.

5. The method of preparing a catalyst which comprises impregnating a carrier with a substantially anhydrous molten mixture comprising a salt of an organic acid with a metal of group IIB of the periodic system dissolved in molten urea acetate.

6. The method of preparing a catalyst which comprises impregnating a carrier with a substantially anhydrous molten mixture comprising a salt of an organic acid with a metal of group IIB of the periodic system dissolved in molten pyridine acetate.

7. The method of preparing a catalyst which comprises impregnating active charcoal with a substantially anhydrous molten mixture comprising a salt of an organic acid with a metal of group IIB of the periodic system dissolved in a molten salt of an organic nitrogen base.

8. The method of preparing a catalyst which comprises impregnating active charcoal with a substantially anhydrous molten mixture comprising zinc acetate dissolved in a molten salt of an organic nitrogen base.

9. The method of preparing a catalyst which comprises impregnating active charcoal with a substantially anhydrous molten mixture comprising zinc acetate dissolved in molten ammonium acetate.

10. The method of preparing a catalyst which comprises impregnating active charcoal with a substantially anhydrous molten mixture comprising cadmium acetate dissolved in molten ammonium acetate.

HERBERT BERG.
HANS HEIM.